US007313129B1

(12) United States Patent
Bova et al.

(10) Patent No.: US 7,313,129 B1
(45) Date of Patent: Dec. 25, 2007

(54) ARRANGEMENT FOR SHARING A SINGLE SIGNALING POINT CODE BETWEEN MULTIPLE HOSTS IN AN IP-BASED NETWORK

(75) Inventors: Thomas Joseph Bova, Arlington, VA (US); Kenneth Alfred Morneault, McLean, VA (US); Spyridon Dimitrios Tsitsonis, Leesburg, VA (US); William Spencer Smart, II, Wake Forest, NC (US); Larry Earl Peterson, Apex, NC (US); Anant Rajabhau Ghotkar, Herndon, VA (US)

(73) Assignee: Cisco Technologiy, Inc., San Jose, CA (US)

( * ) Notice: Subject to any disclaimer, the term of this patent is extended or adjusted under 35 U.S.C. 154(b) by 993 days.

(21) Appl. No.: 10/365,411

(22) Filed: Feb. 13, 2003

(51) Int. Cl.
*H04L 12/66* (2006.01)
*G01R 31/08* (2006.01)

(52) U.S. Cl. ........................... 370/352; 370/225

(58) Field of Classification Search ................ 370/352, 370/225, 389, 401, 252; 379/229, 230, 219
See application file for complete search history.

(56) References Cited

U.S. PATENT DOCUMENTS

| | | | |
|---|---|---|---|
| 6,069,890 A * | 5/2000 | White et al. ................ | 370/352 |
| 6,944,280 B2 * | 9/2005 | Suzuki ....................... | 379/229 |
| 6,987,781 B1 * | 1/2006 | Miller et al. ................ | 370/496 |
| 7,113,581 B2 * | 9/2006 | Benedyk et al. ............ | 379/219 |
| 2001/0049730 A1 * | 12/2001 | Brendes et al. ............. | 709/223 |
| 2003/0169779 A1 * | 9/2003 | Craig .......................... | 370/522 |
| 2005/0105695 A1 * | 5/2005 | Xl ............................... | 379/1.01 |

OTHER PUBLICATIONS

International Telecommunication Union Recommendation Q. 764, Signalling System No. 7—ISDN User Part signalling procedures, Dec. 1999, p. 79.
International Telecommunication Union Recommendation Q. 704, Signalling network functions and messages, Jul. 1996, pp. 51-52.
Ong et al., "Framework Architecture for Signaling Transport", IETF Network Working Group, Request for Comments: 2719, Oct. 1999.
Sidebottom et al, "Signaling System 7 (SS7) Message Transfer Part 3 (MTP3)—User Adaptation Layer (M3UA)", IETF Network Working Group, Request for Comments: 3332, Sep. 2002.
Loughney et al, "Signalling Connection Control Part User Adaptation Layer (SUA)", Ingernet Draft, Internet Engineering Task Force, draft-ietf-sigtran-sua-14.txt, Jun. 30, 2002.

* cited by examiner

*Primary Examiner*—William J. Deane, Jr.
(74) *Attorney, Agent, or Firm*—Leon R. Turkevich

(57) ABSTRACT

A Voice over IP network having multiple signaling message transfer nodes (e.g., call agents, signaling gateways), communicate with switched circuit network nodes using a single point code. A signaling gateway, upon receiving an SS7 signaling message specifying a destination point code corresponding to its provisioned point code and carrying a signaling application protocol message, selects a destination call agent based on the originating point code in the SS7 signaling message and independent of the destination point code. The signaling gateway selectively outputs to the selected destination call agent an IP-based message carrying the signaling application protocol message according to a prescribed IP-based signaling message transport protocol, based on a determined availability of the selected destination call agent. The signaling gateway uses the User Part Unavailable message to inform the originating PSTN switch that the selected destination call agent is unavailable.

56 Claims, 8 Drawing Sheets

ARRANGEMENT FOR SHARING A SINGLE SIGNALING POINT CODE BETWEEN MULTIPLE HOSTS IN AN IP-BASED NETWORK

BACKGROUND OF THE INVENTION

1. Field of the Invention

The present invention relates to Voice Over IP telephony; more particularly, the present invention relates to transport of common channel SS7 signaling messages (e.g., Message Transfer Part 3 (MTP3)) by a signaling gateway, received from a circuit switched network node having a prescribed point code, to a call agent according to a prescribed Voice Over IP telephony protocol such as MTP3 User Adaptation Layer (M3UA) or SCCP User Adaptation (UA) Layer (SUA).

2. Description of the Related Art

Common Channel Interoffice Signaling (CCIS) networks provide out of band signaling for telecommunications networks such as public switched telephone networks. Most of the signaling communications for telephone networks utilize Signaling System 7 (SS7) protocol. An exemplary SS7 compliant CCIS network includes Service Switching Points (SSPs) (i.e., an SS7 capable telephony switch), Signaling Transfer Points (STPs), and data links between the STPs and SSPs and various telephone switching offices of the network.

As recognized in the art, the hardware and software operations of the SS7 protocol are divided into "layers", similar to the Open Systems Interconnect (OSI) Network Model specified by the International Standards Organization (ISO). The "lowest levels" of the SS7 protocol include the Message Transfer Part (MTP) Level 1, Level 2, and Level 3. MTP Level 1 and Level 2 are equivalent to the OSI Physical Layer and the OSI Data Link layer, respectively. MTP Level 3, equivalent to the OSI Network Layer, provides message routing between signaling points in the SS7 network, and reroutes traffic away from failed links and signaling points and controls traffic when congestion occurs.

SS7 messages (also referred to as signal units) are routed throughout the SS7 network based on point codes specified within the SS7 message. In particular, each node of the signaling network is assigned a prescribed point code for purposes of addressing signaling messages throughout the SS7 network. The point code includes components that represent a network hierarchy based on the protocol being deployed.

One type of signal unit, known as a Message Signal Unit (MSU), includes a routing label which allows an originating signaling point to send information to a destination signaling point across the network. The routing label includes an originating point code (OPC) specifying the originating signaling node, a destination point code (DPC) specifying the destination for the SS7 messaging packet, and a signaling link selection (SLS) field. Hence, the selection of outgoing link is based on information in the DPC and SLS.

The size of the point code may vary depending on protocol; for example, each North American point code according to the American National Standards Institute (ANSI) uses 24 bits, whereas each point code specified by the International Telecommunication Union (ITU) uses 14 bits. In particular, an ANSI point code specifies a network hierarchy based on network, cluster, and member octets (e.g., 245-16-0 decimal). ITU-T point codes are pure binary numbers which may be stated in terms of zone, area/network, and signaling point identification numbers. For example, the point code 5557 (decimal) may be stated as 2-182-5 (binary 010 10110110 101).

The Internet Engineering Task Force (IETF) Signaling Transport (Sigtran) Working Group has been addressing the transport of packet-based PSTN signaling over IP Networks, including evaluation of functional and performance requirements of the PSTN signaling. For example, IP networks need to transport signaling messages such as Q.931 or SS7 ISUP messages, received from the PSTN, between IP nodes such as a Signaling Gateway and Media Gateway Controller or IP-resident databases.

Three published proposals for transport of signaling messages include the Request for Comments (RFC) 2719 by Ong et al., "Framework Architecture for Signaling Transport", December 1999, available on the World Wide Web at the address http://www.ietf.org/rfc/rfc2719.txt and RFC 3332 by Sidebottom et al., "Signaling System 7 (SS7) Message Transfer Part 3 (MTP3)—User Adaptation Layer (M3UA)", September 2002, available on the World Wide Web at the address http://www.ietf.org/rfc/rfc3332.txt, and the IETF Draft by Loughney et al., "Signalling Connection Control Part User Adaptation Layer (SUA)", Jun. 30, 2002, available on the World Wide Web at the address http://www.ietf.org/internet-drafts/draft-ietf-sigtran-sua-14.txt, all three disclosures of which are incorporated in their entirety herein by reference.

RFC 2719 specifies a Voice over IP architecture, including interactions between signaling gateways (SGs), media gateways (MGs) and media gateway controllers (MGCs). In particular, media gateways terminate media streams carried by bearer channels of Switched Circuit Networks (SCN). Media gateways also packetize media data, if necessary, and deliver packetized data to the IP network. MGCs manage the resources of the MGs: according to RFC 2719, the MGC serves as a possible termination and origination point for SCN application protocols, such as SS7 ISDN User Part (ISUP) and Q.931/DSS1. An SG is a signaling agent that receives/sends SCN native signaling at the edge of the IP network. The SG function may relay, translate or terminate SS7 signaling in an SS7-Internet Gateway. The SG function also may be co-resident with the MG function to process SCN signaling associated with line or trunk terminations controlled by the MG (e.g., signaling backhaul).

RFC 3332 specifies a Stream Control Transmission Protocol (SCTP) as a transport protocol for transporting SCN-based signaling messages (e.g., SS7) over IP. In particular, the SCTP provides a mechanism for transporting SS7 MTP3-User Part messages (e.g., ISUP, Signalling Connection Control Part (SCCP), Telephone User Part (TUP), etc.) between an SG and an MGC. Hence, an SG implementing SCTP will terminate SS7 MTP2 and MTP3 protocol layers, and deliver ISUP, SCCP and/or any other MTP3-User protocol messages, as well as certain MTP network management events, over SCTP transport associations to MTP3-User peers in MGCs or IP-resident databases.

The Internet Draft by Loughney et al. specifies SUA as a protocol for the transport of any Signalling Connection Control Part-User signalling (e.g., Transaction Capabilities Protocol, Radio Acccess Network Application Protocol, etc.) over IP using the Stream Control Transmission Protocol.

FIG. 1 is a block diagram illustrating an exemplary Voice over IP telephony network 10, deployed according to RFC 2719, RFC 3332, and SUA protocol, for communications with a TDM-based circuit switched public telephony system 12. The telephony system 12 includes TDM switches 13a and 13b having point codes 1.2.1 and 1.2.2 respectively. The TDM switches 13a and 13b may be substituted with mated pairs of signaling transfer points (STPs). The IP-based telephony network 10 includes signaling gateways (SGs) 14a and 14b having point codes 2.1.1 and 2.1.2, respectively. The Voice over IP network 10 also includes MGCs 16a, 16b, and 16c having point codes 1.1.1, 1.1.2, and 1.1.3, respectively, and an IP network 20 for transfer of signaling information between the MGCs and the SGs. Each signaling gateway (e.g., 14a, 14b) is configured for routing a signaling application protocol message (e.g., ISUP, SCCP) carried by a signaling message (e.g., 18a, 18b), from the circuit switched SS7 network 22 to a destination MGC (e.g., 16a, 16c) based on the corresponding destination point code (e.g., DPC=1.1.1, DPC=1.1.3).

FIG. 2 is a diagram illustrating in further detail the user adaptation architecture according to the Sigtran working group, including RFC 2719 and RFC 3332. Each SS7 signaling message 18 output by a signaling endpoint (SEP) 13 (e.g., a TDM switch or STP) includes a signaling application protocol message 24 (e.g., ISUP/SCCP, TCAP/MAP, TUP, etc.) and an MTP layer 26. The SG 14 includes an interworking resource 28 configured for removing the MTP layer, generating an M3UA header 30, and outputting via the IP network 20 an M3UA protocol message 32 having the M3UA header 30 and the user part message 24. The M3UA message 32 is output to the MGC (e.g., 16a) provisioned with the point code corresponding to the destination point code of the SS7 signaling message.

Concerns arise in adding additional Voice over IP-based nodes to accommodate increased traffic and call processing demands within the Voice over IP telephony network. In particular, as the capacity of media gateway controllers (i.e., call agents) supplied by vendors increases (e.g., call processing capacity, number of gateways supported, etc.) existing network engineers may wish to add additional call agent host controllers to enable the deployed network to meet increased traffic and call processing demands. However, building call agent clusters currently requires a dedicated originating point code (OPC) for each call agent pair, making the node appear as multiple switching entities.

Further, although section 1.4.1 of RFC 3332 suggests sharing point codes between a SG and MGCs, no suggestion is made on the manner of implementing the distribution of IP-based messages 32. Hence, concerns arise about the need for sharing of state information between the SG 14 and the MGC 16, and the necessity of proprietary software implementations.

SUMMARY OF THE INVENTION

There is a need for an arrangement that enables a scalable Voice over IP network to be deployed without exhausting limited point code resources.

There also is a need for an arrangement that enables a Voice over IP network, having multiple signaling gateways and call agents (i.e., media gateway controllers), to be deployed as representing a single signaling node using a single point code.

There also is a need that enables multiple signaling message transfer nodes (e.g., call agents, signaling gateways) to share a single point code between each other in a Voice over IP network, without the necessity of state sharing or proprietary messaging between the signaling message transfer nodes.

There also is a need that enables distribution of signaling messages, received from a circuit switched signaling network, to signaling message transfer nodes across a Voice over IP network, using open protocol-based executable resources that elimiate the necessity of proprietary software resources.

There also is a need for an arrangement that enables deployment of a scalable Voice over IP network that can be easily provisioned based on use of a single point code, and that provides a means for notifying a switched signaling network node that an identified user part resource is not available, without otherwise affecting signaling traffic to the Voice over IP network.

These and other needs are attained by the present invention, where a Voice over IP network having multiple signaling message transfer nodes (e.g., call agents, signaling gateways), communicate with switched circuit network nodes using a single point code. A signaling gateway, upon receiving an SS7 signaling message specifying a destination point code corresponding to its provisioned point code and carrying a signaling application protocol message, selects a destination call agent based on the originating point code in the SS7 signaling message and independent of the destination point code. The signaling gateway selectively outputs to the selected destination call agent an IP-based message carrying the signaling application protocol message according to a prescribed IP-based signaling message transport protocol, based on a determined availability of the selected destination call agent.

Hence, the signaling message transfer nodes can share the same single point code, enabling the Voice over IP network to be scaled with added host controllers for increased traffic capacity, without the need for adding new point codes. In addition, a signaling application (e.g., ISUP, SCCP, TUP) can be notified about the unavailability of an application resource, without interrupting signaling application operations associated with the single point code.

One aspect of the present invention provides a method in a signaling gateway in a Voice over IP network. The method includes receiving from a switched circuit network a signaling message specifying an originating point code, a destination point code matching a prescribed point code assigned the signaling gateway, and carrying a signaling application protocol message. The method also includes selecting, based on the originating point code and independent of the destination point code, one of a plurality of call agents sharing the prescribed point code in the Voice over IP network for reception of the signaling application protocol message. The method also includes selectively outputting to the one call agent, based on a determined availability of the one call agent, an IP-based message carrying the signaling application protocol message, according to a prescribed IP-based signaling message transport protocol.

Another aspect of the present invention provides a signaling gateway in a Voice over IP network and configured for communications between a signaling network and an IP-based node. The signaling gateway includes a switched circuit network interface configured for receiving a signaling message from the signaling network, the signaling message specifying an originating point code, a destination point code matching a prescribed point code assigned the signaling gateway, and a signaling application protocol message. The signaling gateway also includes a routing key table, a routing resource, and an IP-based output resource. The routing key table is configured for storing routing keys for respective call agents, each routing key specifying prescribed signaling parameter values for mapping the received signaling application protocol message to one of the call agents. The routing resource is configured for selecting the one call agent based on matching the corresponding one routing key based on the originating point code and independent of the destination point code. The IP-based output resource is configured for selectively outputting to the one call agent, based on a determined availability of the one call agent, an IP-based message carrying the signaling application protocol message, according to a prescribed IP-based signaling message transport protocol.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 3:
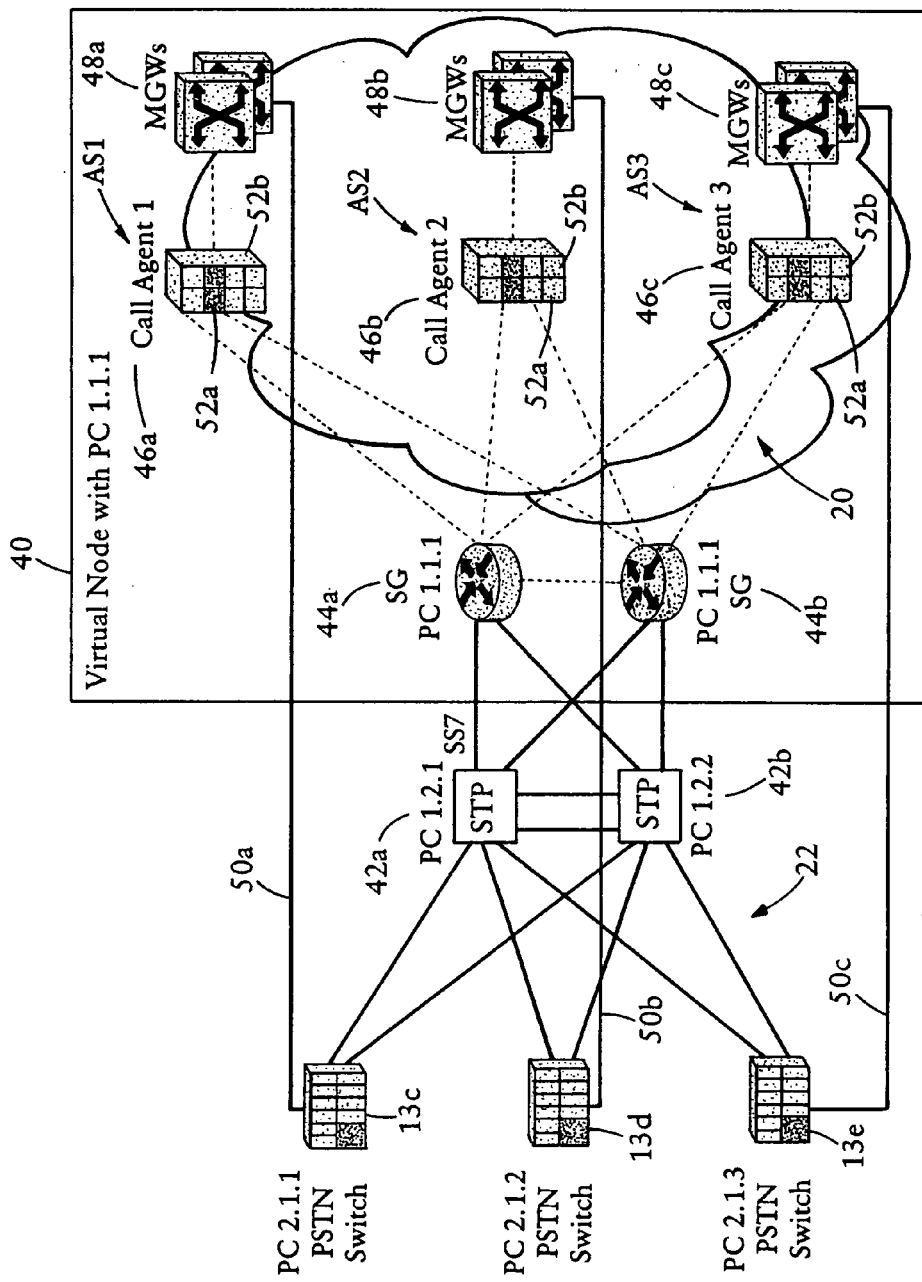
FIG. 3 is a diagram illustrating a Voice over IP network utilizing signaling gateways configured for distributing signaling messages between switched circuit signaling nodes and IP-based call agents, according to an embodiment of the present invention.

FIG. 3 is a block diagram illustrating a Voice over IP network 40 configured for interfacing with a switched circuit network 12 having an SS7 signaling network 22, according to an embodiment of the present invention. As illustrated in FIG. 3, the switched circuit network 12 includes PSTN switches 13c, 13d and 13e having respective point codes 2.1.1, 2.1.2, and 2.1.3. The switched circuit network 12 also includes a mated pair of STPs 42a and 42b having respective point codes 1.2.1 and 1.2.2.

The Voice over IP network 40 includes signaling message transfer nodes, for example signaling gateways and call agents, sharing the same point code 1.1.1. In particular, the Voice over IP network 40 includes signaling gateways 44 (e.g., 44a and 44b), call agents 46 (e.g., 46a, 46b, and 46c), and media gateways 48a, 48b, and 48c. The media gateways 48a, 48b, and 48c are configured for establishing media connections with the PSTN switches 13c, 13d, and 13e via trunk lines 50a, 50b, and 50c, respectively. The media gateways 48a, 48b, and 48c are controlled by the call agents 46a, 46b, and 46c, respectively. The signaling gateways 44 are connected via A-links to the respective mated pairs of STPs 42; alternately, in the case that the PSTN network 12 does not use STPs 42, but rather utilizes external service switching points (SSPs), the signaling gateways may be connected via F-links.

Each call agent 46 is configured for communication with the signaling gateway 44 via the IP network 20, in compliance with the above-incorporated proposals by the IETF Sigtran Working Group, including RFC 2719, RFC 3332, and the IETF Draft by Loughney et al. on SUA. In particular, the call agents 46a, 46b, and 46c are assigned an Application Server identity AS1, AS2, and AS3, respectively, for use by the signaling gateways 44 in identifying the corresponding call agent 46. Each call agent 46 also is deployed using host controller pairs 52a and 52b, where one host controller 52a executes the call agent processing while the other host controller 52b maintains a standby condition; as described below, the pair of host controllers enables call agent processing to be transferred to the second host controller 52b in the event the first host controller 52a encounters a failure or is shutdown for service or maintenance.

As described below, the signaling gateways 44 include a routing key table having routing keys, were each routing key specifies prescribed signaling parameter values that enable the signaling gateway 44 to map a received signaling message 18 to a corresponding selected call agent 46.

However, concerns arise regarding an arbitrary implementation of a voice over IP network utilizing a single point code that may result in a particularly inefficient implementation. In particular, it is desired that a voice over IP network utilizing a single point code may have the following features: that the voice over IP network does not require state sharing between SG and MGC (i.e., the call agent) that would then require proprietary changes or additions to M3UA/SUA. There also is a need that the voice over IP network provide a seamless implementation with current Service Provider provisioning schemes, and can be easily managed. In addition, there is a need that enables the voice over IP network to respond to call agent failures, and eventual return to service by the call agent.

According to the disclosed embodiment, the signaling gateways 44, in response to receiving a signaling message 18 specifying an OPC, a DPC matching the provisioned point code assigned the signaling gateway (e.g., 1.1.1) and a signaling application protocol message 24 (e.g., ISUP, SCCP, TUP, etc.), are configured for selecting a destination call agent 46 for reception of the signaling application protocol message 24, and selectively outputting an IP-based signaling message carrying the signaling application protocol message 24, based on a determined availability of the selected call agent 46. As described below with respect to FIG. 5, actual selection of a routing key for a corresponding call agent, identified by its application server designation, may also depend on the particular user part application information within the signaling application protocol message 24; however, regardless of the type of user part application, the signaling gateway 44 selects one of the call agents 46 based on the originating point code and independent of the destination point code.

Hence, provisioning operations during deployment are greatly simplified, since signaling traffic can be routed to a destination call agent 46 based on the originating point code identifying the PSTNs signaling node 13 having generated the signaling message.

Further, the signaling gateway 44 selectively outputs the IP message to the call agent 46, based on determining whether the destination call agent is available to receive the message; if the signaling gateway 44 determines that the destination call agent 46 has been unavailable for a brief interval (i.e., within a prescribed recovery interval), the signaling gateway 44 queues the IP message in the event that the destination call agent recovers within the prescribed recovery interval. If the signaling gateway 44 determines that a destination call agent 46 has been unavailable past a prescribed recovery interval, the signaling gateway 44 may drop the received signaling message and return a user part unavailable signaling message to the originator of the signaling message, specifying that the user intended to receive the signaling application protocol message is unavailable. Once the destination call agent returns to an active state, the signaling gateway 44 resumes passing signaling messages to the destination call agent, enabling the call agent to respond to a user part test message by sending a user part available message, resuming the user part application with the SEP 13.

Hence, the signaling gateway 44 can control signaling traffic distribution based on identifying the appropriate call agents 46 based on the originating point code identifying the originating SEP 13 having sent the signaling message, and based on status messages received from the call agents identifying their respective availability for receiving messages.

Figure 4:
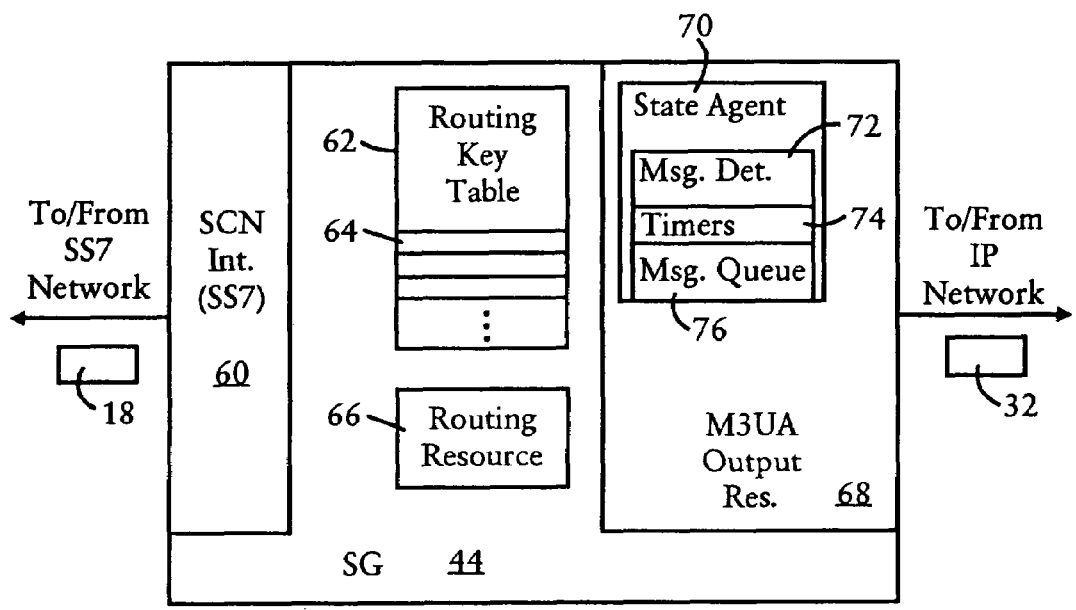
FIG. 4 is a diagram illustrating in detail the signaling gateway of FIG. 3.

FIG. 4 is a diagram illustrating in detail the signaling gateway 44 according to an embodiment of the present invention. The signaling gateway 44 includes a switched circuit network (SCN) interface 60 configured for sending and receiving signaling messages 18 (e.g., SS7 messages) to and from the signaling network 22. As described above with respect to FIG. 2, each signaling message 18 includes an MTP layer 26 specifying an originating point code that identifies the SEP 13 having sent the signaling message 18, a destination point code matching the prescribed (i.e., provisioned) point code assigned the signaling gateway 44, and a signaling application protocol message 24.

The signaling gateway 44 also includes a routing key table 62 having multiple routing keys 64, a routing resource 66, and an IP based output resource 68. The IP based output resource, implemented according to M3UA and SUA protocols, includes a state agent 70 having a message decoder and encoder resource 72, recovery timers 74, and messaging queues 76, described below.

Figure 5:
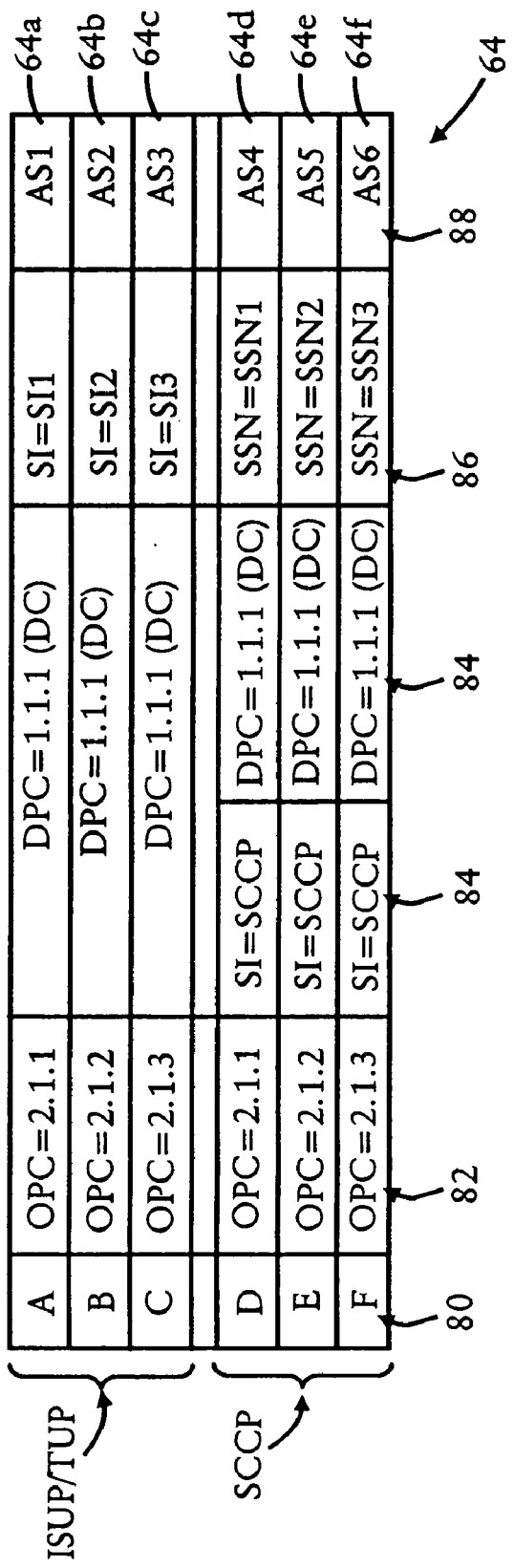
FIG. 5 is a diagram illustrating in detail the routing keys stored in the routing key table of FIG. 4.

The routing key table 62 is configured for storing routing keys 64, illustrated in FIG. 5, for respective call agents 46. The routing resource 66 is configured for selecting one of the call agents 46 based on matching the corresponding routing key 64 based on the originating point code and independent of the destination point code. As described below with respect to FIG. 5, other signaling parameters may be utilized based on the user part application being transported.

FIG. 5 is a diagram illustrating in further detail the routing keys 64. Each of the routing keys 64 include a routing context 80, an originating point code key field 82, secondary key fields 84 and 86, and an application server identifier 88. The routing context 80, illustrated as capital letters, is implemented as a four-byte value that uniquely identifies the corresponding routing key 64. Hence, the routing keys 64*a*, 64*b*, 64*c*, 64*d*, 64*e*, and 64*f* are identified by their respective four-byte context values represented in FIG. 5 as "A, B, C, D, E, and F", respectively.

Each routing key 64 also has an associated originating point code key 82 that maps the received signaling message to the corresponding call agent 46. Certain user part application-based routing keys also may specify additional key fields; for example, ISUP or TUP routing keys 64*a*, 64*b*, and 64*c* also will specify a service indicator (SI) key; SCCP routing keys 64*d*, 64*e*, 64*f* also will specify SI key fields and subsystem number (SSN) key fields. Note that ISUP/TUP key fields may include a DPC field, however, since the information is redundant, the DPC information is a don't care situation (DC) and hence not used by the routing resource 66. While not used as a routing resource, the DPC will be used to filter incoming messages: if the DPC does not match, the message is dropped, as there is no need to route the message.

Hence, ISUP and TUP routing keys include OPC, DPC, and SI values. As illustrated in FIG. 5, there is a 1-to-1 relationship between routing keys 64 and application servers 88. Hence, a given routing key 64 is assigned to a single application server. The SCCP routing keys will be defined by the OPC, the SI, and the SSN. The SSN in the signaling gateway routing key 64 refers to the local SSN of each call agent.

Figure 1:
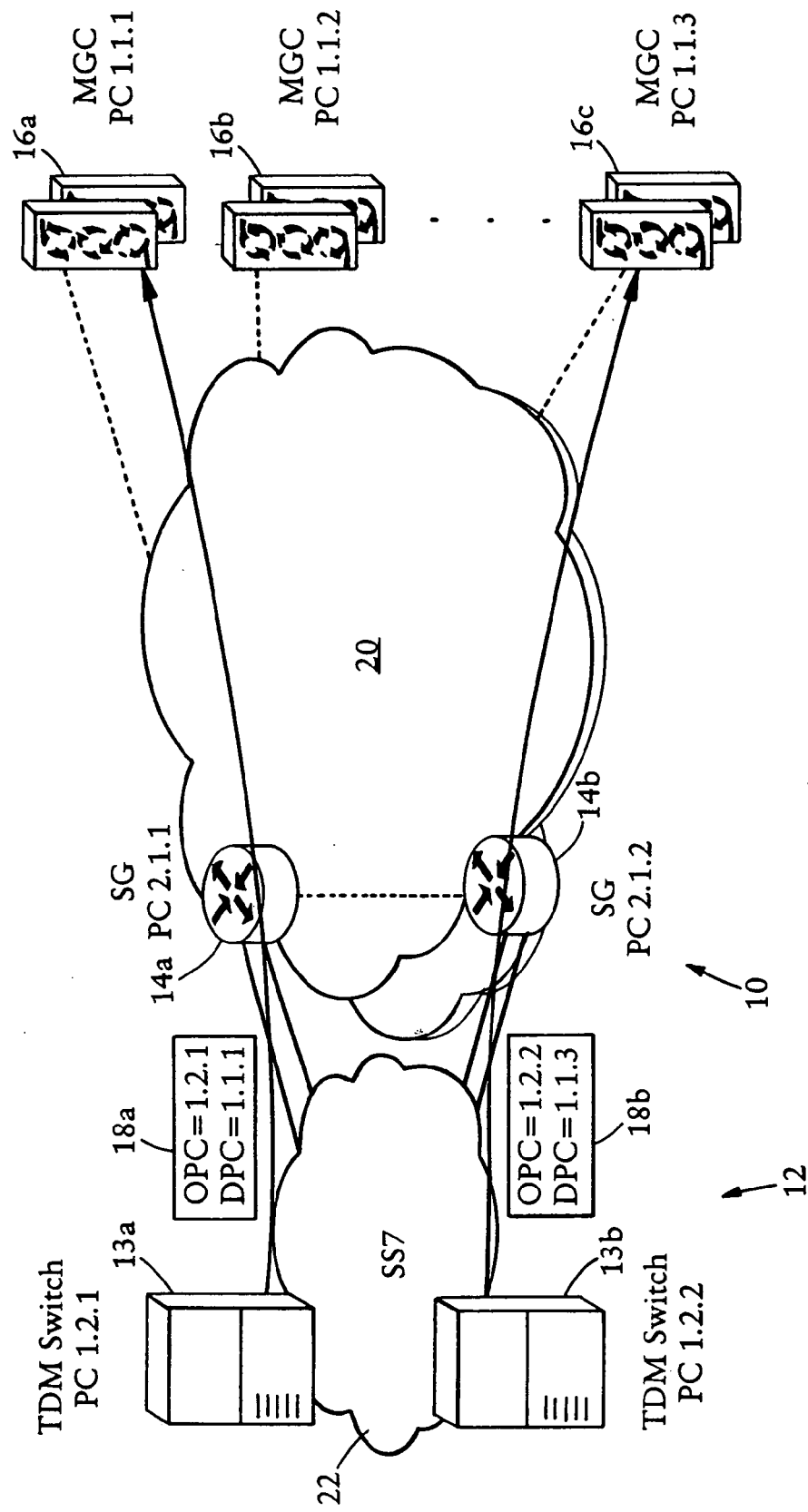
FIG. 1 is a diagram illustrating a prior known (PRIOR ART) architecture for transporting SS7 signaling messages to nodes in an IP network.
Figure 2:
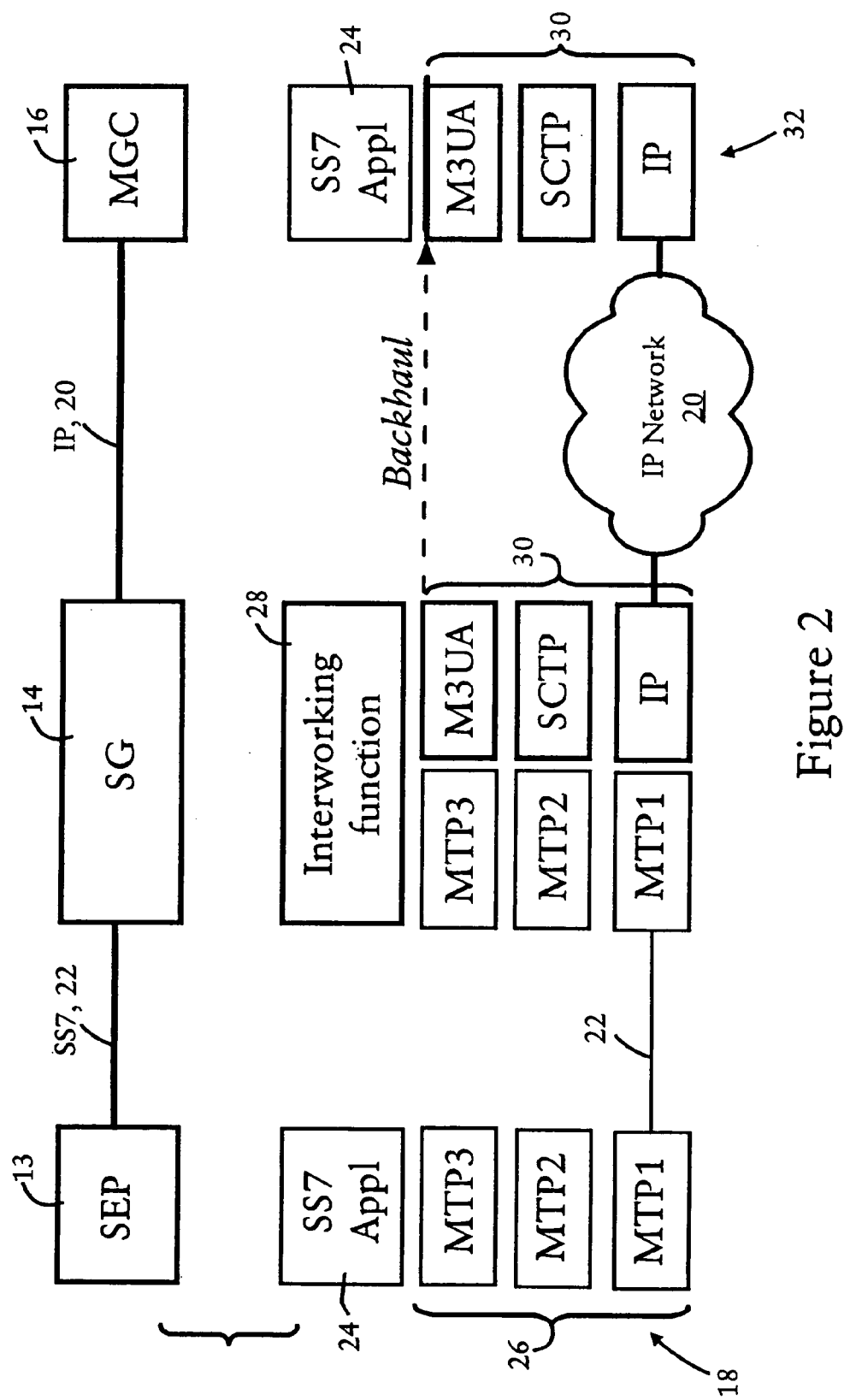
FIG. 2 is a (PRIOR ART) diagram illustrating interworking between an circuit switched (e.g., SS7) signaling node, a signaling gateway, and an IP node according to a known protocols.

Hence, the routing resource 66, in response to receiving a signaling message 18, identifies from the received signaling message the OPC, and any relevant user part signaling parameters (e.g., SI, SSN) to identify the routing key 64 having matching key value entries. The destination call agent (e.g., 46*a*) is identified by the routing resource 66 based on the corresponding application server identifier 88 (e.g., AS1). Once the routing resource 66 has selected the destination call agent based on matching the corresponding routing key with the relevant signaling information specified in the received signaling message 18, the IP-based output resource 68 selectively determines whether to output an IP-based message 32 carrying the signaling application protocol message 24 as illustrated in FIG. 2.

When a call agent is unavailable due to either a catastrophic failure or administrative reasons, the virtual node 40 must inform the affected PSTN switches 13; however, since only a portion of the node is unavailable, the MTP3 Transfer Prohibit (TFP) message cannot be used, since the operation of the remaining call agents must not be affected.

According to the disclosed embodiment, the signaling gateway 44 selectively outputs MTP3 User Part Unavailable (UPU) messages in conjunction with user part specific messages (e.g., the SI value of the user part that is unavailable) to signal PSTN switches when a call agent is out of service. A UPU message with a cause code of "user part inaccessible" is sent by the signaling gateway when an ISUP or TUP message is received and the call agent (identified by its AS) is unavailable.

Figure 6A:
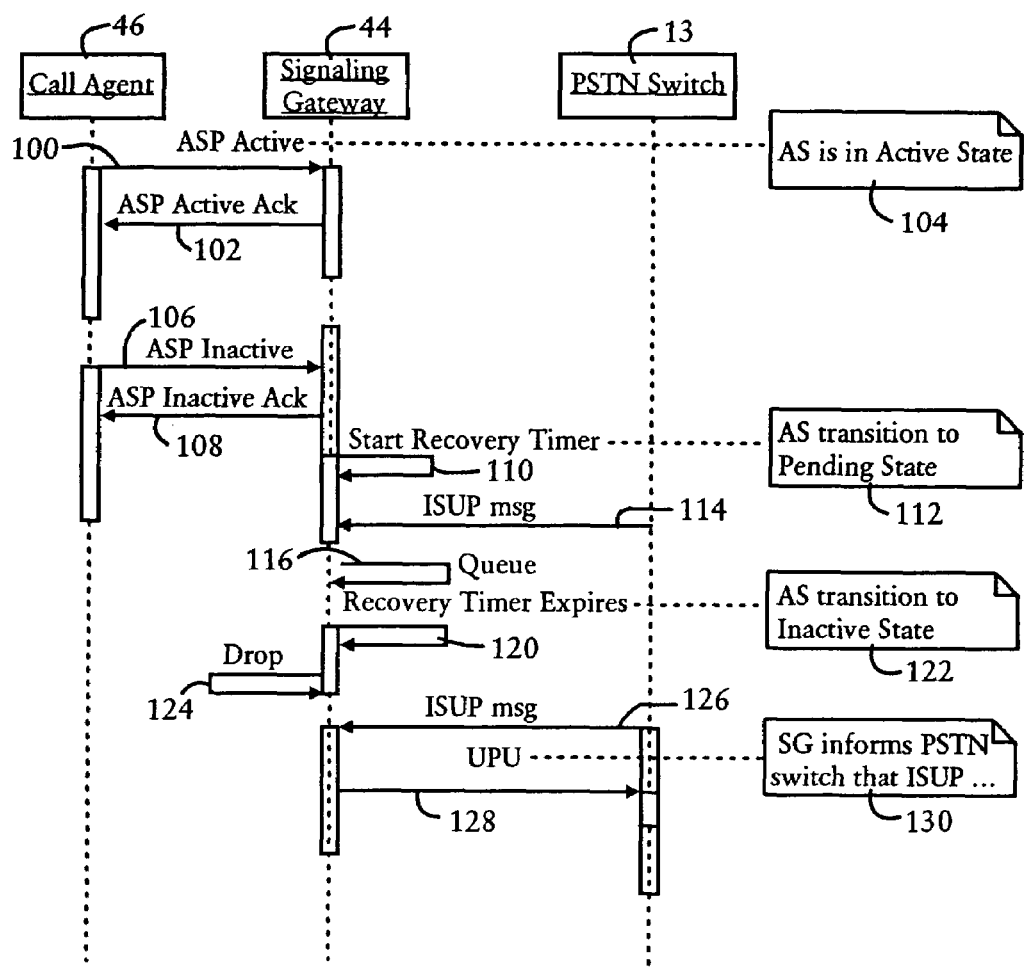
FIGS. 6A, 6B, and 6C are diagrams summarizing the selective forwarding to signaling application protocol messages to call agents, and selective output of a user part unavailability signaling message to a circuit switched signaling node, according to an embodiment of the present invention.
Figure 6B:
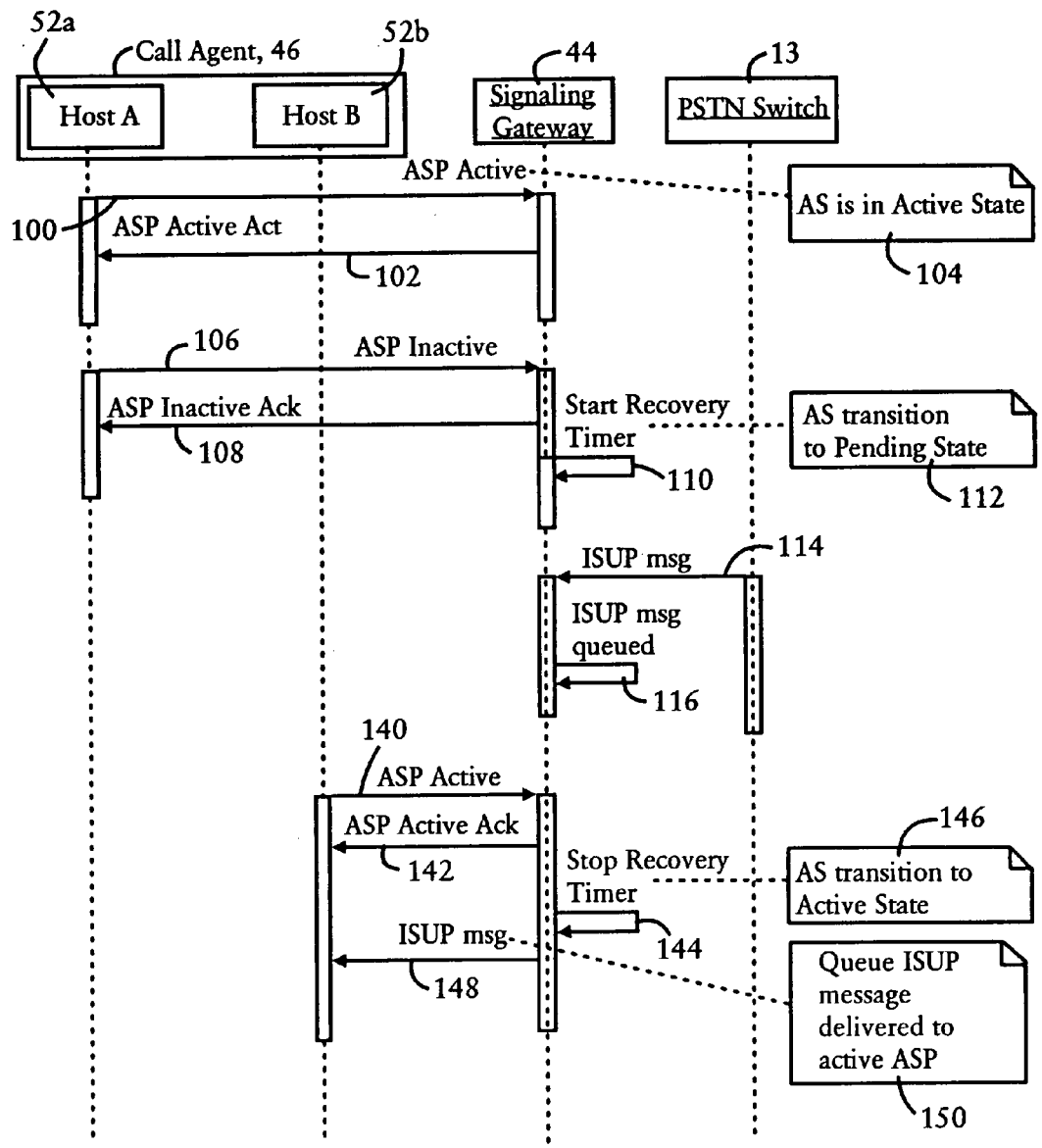
Figure 6C:
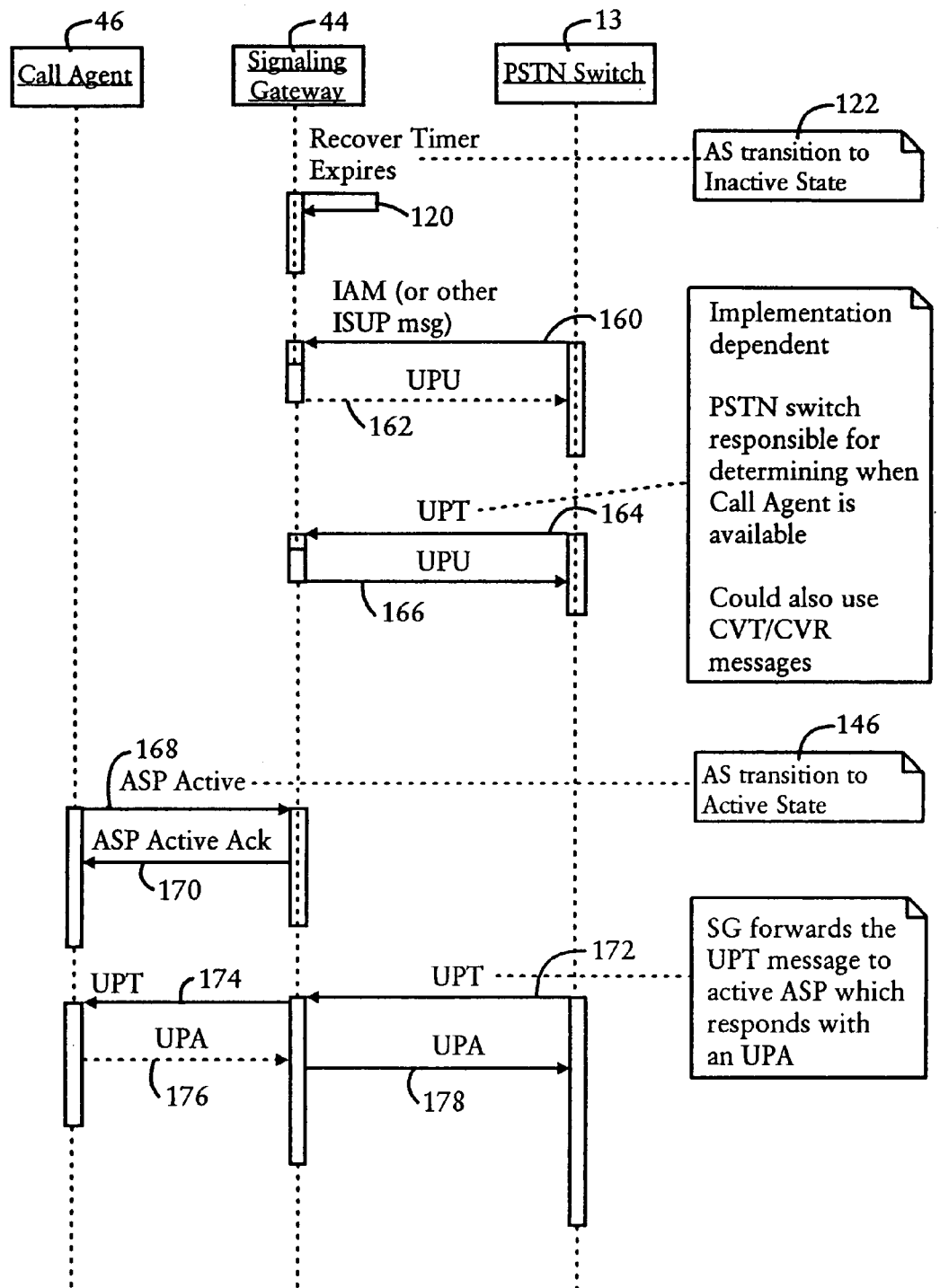

FIGS. 6A, 6B, and 6C are diagrams summarizing the method of selectively outputting the IP-based message 32, based on a determined availability of the destination call agent 46, according to an embodiment of the present invention. The steps described herein with respect to FIGS. 6A, 6B, and 6C can be implemented as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 100, where the call agent 46 sends an ASP active message, also referred to as an active application server process message, to the signaling gateway 44. The message detector 72 in the state agent 70 of the signaling gateway 44 detects the ASP active message, and the state agent 70 outputs in step 102 an acknowledgment message to the call agent 46 having sent the ASP active message and registers the call agent 46 as being in an active state 104.

Assume in step 106 that the call agent 46 outputs an ASP inactive message, also referred to as an inactive application server process message, indicating that the call agent 46 is no longer available. The message detector 72, in response to receiving the ASP inactive message, causes the state agent 70 to send an ASP inactive acknowledgment message in step 108, register the call agent 46 as being in a pending recovery state 112, and start in step 110 a recovery timer 74.

The recovery timer 74 is configured for counting a prescribed recovery interval, enabling the call agent 46 to recover from the pending state 112 to the active state 104. If the signaling gateway 44 receives in step 114 a signaling message 18 (e.g., ISUP message) from the PSTN switch 13 for the call agent 46 during the pending state 112, the state agent 70 queues in step 116 the IP-based message 32 that would normally be output to the call agent 46.

If in step 120 the state agent 70 determines that the recovery timer 74 has expired, the state agent 70 registers the call agent 46 as being in an inactive state 122, and drops the received signaling message and/or the queued IP-based message 32 in step 124. If during the inactive state 122 the PSTN switch 13 sends in step 126 another signaling message for the same user part, the signaling gateway 44 sends in step 128 a user part unavailable (UPU) message indicating to the switch in step 130 that the user part intended to receive the signaling application protocol message is unavailable. Hence, the SSP application having sent the user part message is notified that the corresponding user part application is unavailable, while the remainder of the virtual node 40 is available for other user part applications.

FIG. 6B illustrates a variation of FIG. 6A, where recovery from the pending state 112 is executed by the second host controller 52b following inactivation of the first host controller 52a. In particular, steps 100 through 116 are the same as FIG. 6A in that the first host controller 52a ("Host A") notifies the signaling gateway 44 that the call agent 46 is inactive, causing the signaling gateway 44 to start the recovery timer in step 110 and queue in step 116 any signaling messages received during the pending state 112. In this case, the second host 52b ("Host B") sends in step 140 an ASP active message for the same AS as previously executed by the host controller 52a.

In response to detecting the ASP active message by the message detector 72, the state agent 70 in the signaling gateway 44 sends in step 142 an ASP active acknowledgment message to the host controller 52b, stops in step 144 the recovery timer 74 and registers the call agent 46 by its AS as transitioning to an active state 146, and sends in step 148 all queued messages to the active application server process, registering the state 150 that all queued messages have been delivered.

FIG. 6C is a diagram illustrating in further detail possible user part unavailability messages sent by the signaling gateway to the PSTN switch 13. FIG. 6C assumes the call agent 46 is in the inactive state 122 based on the recovery timer having expired in step 120. If the PSTN switch 13 sends in step 160 a signaling message for the inactive call agent 46, for example an Initial Address Message (IAM) or another ISUP message, the signaling gateway 44 responds by returning a user part unavailable message in step 162: in this case the received signaling message is not queued because the call agent 46 is registered as being in an inactive state 122. The subsequent response in step 164 by the PSTN switch 13 may be implementation dependent: the PSTN switch may send a user part test (UPT) message, or CVT/CVR messages; in either case, the signaling gateway continues to respond by sending UPU messages in step 166.

Once the call agent 46 sends in step 168 an ASP active message indicating it is resuming active state, the signaling gateway 44 sends in step 170 an ASP active acknowledgment message, and registers that the application server has transitioned to the active state 146. Any subsequent UPT message sent in step 172 by the PSTN switch 13 is forwarded by the signaling gateway 44, according to M3UA protocol, to the call agent 46 in step 174. The call agent 46 responds in step 176 to the UPT message by sending an IP based M3UA message carrying a User Part Available (UPA) message. The signaling gateway 44, in response to receiving the UPA message according to M3UA protocol, outputs in step 178 the UPA message using MTP3 protocol.

According to the disclosed embodiment, an arrangement providing a single point code enables calls to be scaled without the necessity of obtaining additional SS7 point codes. Further, the single point code voice over IP network 40 can be implemented in a robust manner with minimal impact to the call agent or the signaling gateway. Further, the disclosed arrangement simplifies provisioning and management for a network operator, since traffic is routed to each call agent based on the originating point code identifying the signaling message originator in the switched circuit network.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a signaling gateway in a Voice over IP network, the method including:
   receiving from a switched circuit network a signaling message specifying an originating point code, a destination point code matching a prescribed point code assigned the signaling gateway, and carrying a signaling application protocol message;
   selecting, based on the originating point code and independent of the destination point code, one of a plurality of call agents sharing the prescribed point code in the Voice over IP network for reception of the signaling application protocol message; and
   selectively outputting to the one call agent, based on a determined availability of the one call agent, an IP-based message carrying the signaling application protocol message, according to a prescribed IP-based signaling message transport protocol.

2. The method of claim 1, wherein the selecting step includes identifying one of a plurality of routing keys based on a match between the originating point code and a service indicator value specified in the signaling message with a corresponding originating point code key and service indicator key in the corresponding one routing key, the routing key identifying the one call agent.

3. The method of claim 2, wherein the identifying step includes matching a subsystem number (SSN), specified within the signaling message, with a subsystem number specified in the one routing key.

4. The method of claim 3, wherein the signaling application protocol message is a Signalling Connection Control Part (SCCP) message according to MTP3 protocol.

5. The method of claim 2, wherein the signaling application protocol message is one of an ISDN User Part (ISUP) message or a Telephone User Part (TUP) message according to MTP3 protocol.

6. The method of claim 1, wherein the selectively outputting step includes determining that the one call agent is in an active state based on receiving an active application server process message from the one call agent.

7. The method of claim 1, wherein the selectively outputting step includes queuing the IP-based message in response to detecting the one call agent having been in an inactive state for within a prescribed recovery interval.

8. The method of claim 7, wherein the selectively outputting step further includes detecting the inactive state based on receiving an inactive application server process message from the one call agent.

9. The method of claim 7, wherein the selectively outputting step further includes outputting the queued IP-based message according to one of M3UA or SUA protocol in response to detecting, within the prescribed recovery interval, the one call agent returning to an active state.

10. The method of claim 9, wherein the selectively outputting step includes determining that the one call agent has returned to the active state based on receiving an active application server process message from the one call agent.

11. The method of claim 9, wherein:
the one call agent is executed by one of first or second host controllers;
the signaling gateway detects the one call agent entered the inactive state based on receiving an inactive application server process message from the first host controller; and
the signaling gateway detects the one call agent returns to the active state by receiving an active application server process message from one of the first or second host controllers.

12. The method of claim 7, wherein the selectively outputting step includes dropping the queued IP-based message in response to detecting the expiration of the prescribed recovery interval without the one call agent returning to an active state.

13. The method of claim 1, wherein the selectively outputting step includes:
determining that the one call agent has been in an inactive state for at least a prescribed recovery interval upon receiving the signaling message;
dropping the signaling message based on the determining step; and
selectively sending, based on the determining step, a user part unavailable signaling message to an originator of the signaling message, based on the originating point code, specifying that a user part intended to receive the signaling application protocol message is unavailable.

14. The method of claim 13, wherein the determining step includes:
determining that the one call agent has entered the inactive state based on receiving an inactive application server process message from the one call agent; and
starting a recovery timer in response to receiving the inactive application server process message, the prescribed recovery interval being determined relative to the recovery timer.

15. A signaling gateway in a Voice over IP network and configured for communications between a signaling network and an IP-based node, the signaling gateway comprising:
a switched circuit network interface configured for receiving a signaling message from the signaling network, the signaling message specifying an originating point code, a destination point code matching a prescribed point code assigned the signaling gateway, and a signaling application protocol message;
a routing key table configured for storing routing keys for respective call agents, each routing key specifying prescribed signaling parameter values for mapping the received signaling application protocol message to one of the call agents;
a routing resource configured for selecting the one call agent based on matching the corresponding one routing key based on the originating point code and independent of the destination point code; and
an IP-based output resource configured for selectively outputting to the one call agent, based on a determined availability of the one call agent, an IP-based message carrying the signaling application protocol message, according to a prescribed IP-based signaling message transport protocol.

16. The gateway of claim 15, wherein the routing resource is configured for identifying one of the routing keys based on a match between the originating point code and a service indicator value specified in the signaling message with a corresponding originating point code key and service indicator key in the corresponding one routing key, the routing key identifying the one call agent.

17. The gateway of claim 16, wherein the routing resource is configured for matching a subsystem number (SSN), specified within the signaling message, with a subsystem number specified in the one routing key.

18. The gateway of claim 17, wherein the signaling application protocol message is a Signalling Connection Control Part (SCCP) message according to MTP3 protocol.

19. The gateway of claim 16, wherein the signaling application protocol message is one of an ISDN User Part (ISUP) message or a Telephone User Part (TUP) message according to MTP3 protocol.

20. The gateway of claim 15, wherein the IP-based output resource is configured for determining that the one call agent is in an active state based on receiving an active application server process message from the one call agent.

21. The gateway of claim 15, wherein the IP-based output resource is configured for queuing the IP-based message in response to detecting the one call agent having been in an inactive state for within a prescribed recovery interval.

22. The gateway of claim 21, wherein the IP-based output resource is configured for detecting the inactive state based on receiving an inactive application server process message from the one call agent.

23. The gateway of claim 21, wherein the IP-based output resource is configured for outputting the queued IP-based message according to one of M3UA or SUA protocol in response to detecting, within the prescribed recovery interval, the one call agent returning to an active state.

24. The gateway of claim 23, wherein the IP-based output resource is configured for determining that the one call agent has returned to the active state based on receiving an active application server process message from the one call agent.

25. The gateway of claim 23, wherein:
the one call agent is executed by one of first or second host controllers;
the IP-based output resource is configured for detecting the one call agent entered the inactive state based on receiving an inactive application server process message from the first host controller; and
the IP-based output resource is configured for detecting the one call agent returns to the active state by receiving an active application server process message from one of the first or second host controllers.

26. The gateway of claim 21, wherein the IP-based output resource is configured for dropping the queued IP-based message in response to detecting the expiration of the prescribed recovery interval without the one call agent returning to an active state.

27. The gateway of claim 15, wherein the IP-based output resource is configured for:
   determining that the one call agent has been in an inactive state for at least a prescribed recovery interval upon receiving the signaling message and in response dropping the signaling message; and
   selectively sending, based on the one call agent having been in the inactive state for at least the prescribed interval upon receiving the signaling message, a user part unavailable signaling message to an originator of the signaling message, based on the originating point code, specifying that a user part intended to receive the signaling application protocol message is unavailable.

28. The gateway of claim 27, wherein the IP-based output resource is configured for:
   determining that the one call agent has entered the inactive state based on receiving an inactive application server process message from the one call agent; and
   starting a recovery timer in response to receiving the inactive application server process message, the prescribed recovery interval being determined relative to the recovery timer.

29. A computer readable medium having stored thereon sequences of instructions for sending a signaling application protocol message from a received signaling message to a selected one of a plurality of call agents in a Voice over IP network, the sequences of instructions including instructions for:
   receiving from a switched circuit network a signaling message specifying an originating point code, a destination point code matching a prescribed point code assigned the signaling gateway, and carrying a signaling application protocol message;
   selecting, based on the originating point code and independent of the destination point code, one of a plurality of call agents sharing the prescribed point code in the Voice over IP network for reception of the signaling application protocol message; and
   selectively outputting to the one call agent, based on a determined availability of the one call agent, an IP-based message carrying the signaling application protocol message, according to a prescribed IP-based signaling message transport protocol.

30. The medium of claim 29, wherein the selecting step includes identifying one of a plurality of routing keys based on a match between the originating point code and a service indicator value specified in the signaling message with a corresponding originating point code key and service indicator key in the corresponding one routing key, the routing key identifying the one call agent.

31. The medium of claim 30, wherein the identifying step includes matching a subsystem number (SSN), specified within the signaling message, with a subsystem number specified in the one routing key.

32. The medium of claim 31, wherein the signaling application protocol message is a Signalling Connection Control Part (SCCP) message according to MTP3 protocol.

33. The medium of claim 30, wherein the signaling application protocol message is one of an ISDN User Part (ISUP) message or a Telephone User Part (TUP) message according to MTP3 protocol.

34. The medium of claim 29, wherein the selectively outputting step includes determining that the one call agent is in an active state based on receiving an active application server process message from the one call agent.

35. The medium of claim 29, wherein the selectively outputting step includes queuing the IP-based message in response to detecting the one call agent having been in an inactive state for within a prescribed recovery interval.

36. The medium of claim 35, wherein the selectively outputting step further includes detecting the inactive state based on receiving an inactive application server process message from the one call agent.

37. The medium of claim 35, wherein the selectively outputting step further includes outputting the queued IP-based message according to one of M3UA or SUA protocol in response to detecting, within the prescribed recovery interval, the one call agent returning to an active state.

38. The medium of claim 37, wherein the selectively outputting step includes determining that the one call agent has returned to the active state based on receiving an active application server process message from the one call agent.

39. The method of claim 37, wherein:
   the one call agent is executed by one of first or second host controllers;
   the signaling gateway detects the one call agent entered the inactive state based on receiving an inactive application server process message from the first host controller; and
   the signaling gateway detects the one call agent returns to the active state by receiving an active application server process message from one of the first or second host controllers.

40. The medium of claim 35, wherein the selectively outputting step includes dropping the queued IP-based message in response to detecting the expiration of the prescribed recovery interval without the one call agent returning to an active state.

41. The medium of claim 29, wherein the selectively outputting step includes:
   determining that the one call agent has been in an inactive state for at least a prescribed recovery interval upon receiving the signaling message;
   dropping the signaling message based on the determining step; and
   selectively sending, based on the determining step, a user part unavailable signaling message to an originator of the signaling message, based on the originating point code, specifying that a user part intended to receive the signaling application protocol message is unavailable.

42. The medium of claim 41, wherein the determining step includes:
   determining that the one call agent has entered the inactive state based on receiving an inactive application server process message from the one call agent; and
   starting a recovery timer in response to receiving the inactive application server process message, the prescribed recovery interval being determined relative to the recovery timer.

43. A signaling gateway in a Voice over IP network, the signaling gateway comprising:
   means for receiving from a switched circuit network a signaling message specifying an originating point code, a destination point code matching a prescribed point code assigned the signaling gateway, and carrying a signaling application protocol message;
   means for selecting, based on the originating point code and independent of the destination point code, one of a plurality of call agents sharing the prescribed point code in the Voice over IP network for reception of the signaling application protocol message; and means for selectively outputting to the one call agent, based on a determined availability of the one call agent, an IP-based message carrying the signaling application protocol message, according to a prescribed IP-based signaling message transport protocol.

44. The gateway of claim 43, wherein the selecting means is configured for identifying one of a plurality of routing keys based on a match between the originating point code and a service indicator value specified in the signaling message with a corresponding originating point code key and service indicator key in the corresponding one routing key, the routing key identifying the one call agent.

45. The gateway of claim 44, wherein the selecting means is configured for matching a subsystem number (SSN), specified within the signaling message, with a subsystem number specified in the one routing key.

46. The gateway of claim 45, wherein the signaling application protocol message is a Signalling Connection Control Part (SCCP) message according to MTP3 protocol.

47. The gateway of claim 44, wherein the signaling application protocol message is one of an ISDN User Part (ISUP) message or a Telephone User Part (TUP) message according to MTP3 protocol.

48. The gateway of claim 43, wherein the selectively outputting means is configured for determining that the one call agent is in an active state based on receiving an active application server process message from the one call agent.

49. The gateway of claim 43, wherein the selectively outputting means is configured for queuing the IP-based message in response to detecting the one call agent having been in an inactive state for within a prescribed recovery interval.

50. The gateway of claim 49, wherein the selectively outputting means is configured for detecting the inactive state based on receiving an inactive application server process message from the one call agent.

51. The gateway of claim 49, wherein the selectively outputting means is configured for outputting the queued IP-based message according to one of M3UA or SUA protocol in response to detecting, within the prescribed recovery interval, the one call agent returning to an active state.

52. The gateway of claim 51, wherein the selectively outputting means is configured for determining that the one call agent has returned to the active state based on receiving an active application server process message from the one call agent.

53. The gateway of claim 51, wherein:

the one call agent is executed by one of first or second host controllers;

the selectively outputting means is configured for detecting the one call agent entered the inactive state based on receiving an inactive application server process message from the first host controller; and the selectively outputting means is configured for detecting the one call agent returns to the active state by receiving an active application server process message from one of the first or second host controllers.

54. The gateway of claim 49, wherein the selectively outputting means is configured for dropping the queued IP-based message in response to detecting the expiration of the prescribed recovery interval without the one call agent returning to an active state.

55. The gateway of claim 43, wherein the selectively outputting means is configured for:

determining that the one call agent has been in an inactive state for at least a prescribed recovery interval upon receiving the signaling message and in response dropping the signaling message; and selectively sending, based on determining that the one call agent has been in an inactive state for at least a prescribed recovery interval upon receiving the signaling message, a user part unavailable signaling message to an originator of the signaling message, based on the originating point code, specifying that a user part intended to receive the signaling application protocol message is unavailable.

56. The gateway of claim 55, wherein the selectively outputting means is configured for:

determining that the one call agent has entered the inactive state based on receiving an inactive application server process message from the one call agent; and starting a recovery timer in response to receiving the inactive application server process message, the prescribed recovery interval being determined relative to the recovery timer.

* * * * *